Dec. 1, 1925.
W. J. FEMAL
1,563,695
COMBINED CATCH BASIN AND TRAP
Filed April 25, 1925    2 Sheets-Sheet 1
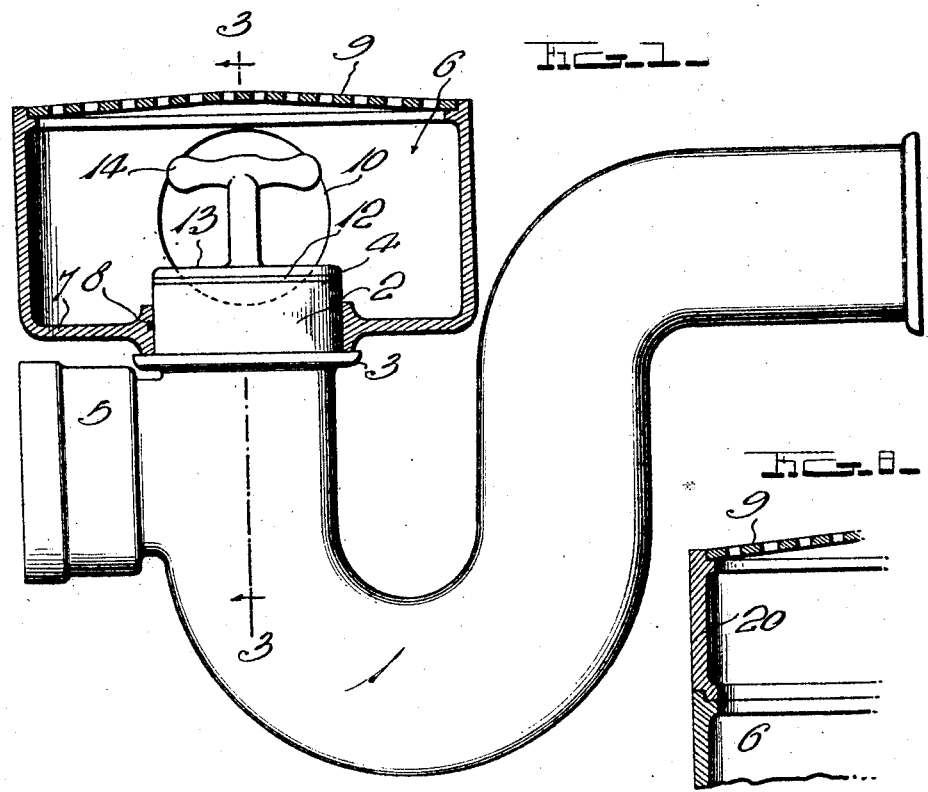
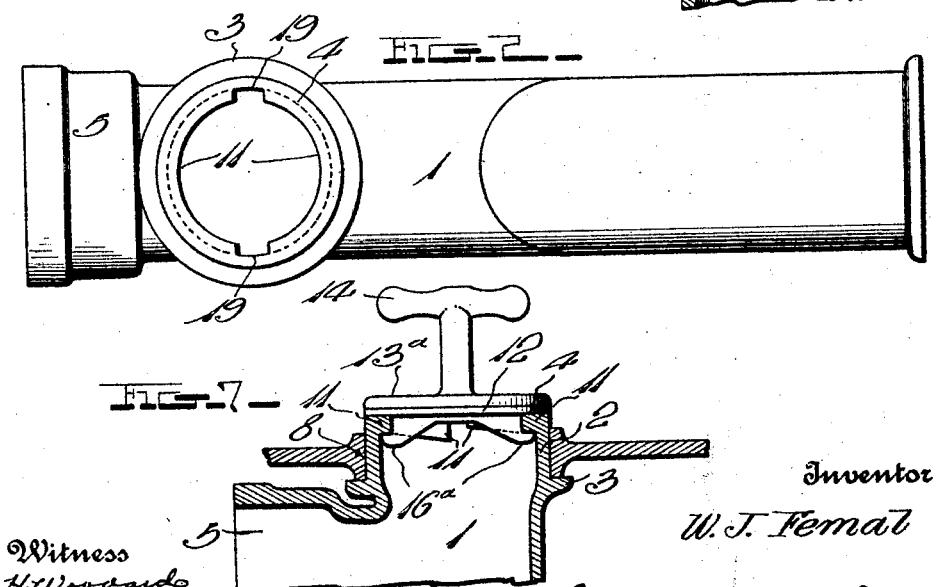
Witness
H. Woodard
Inventor
W. J. Femal
By H. R. Wilson Yeo
Attorneys

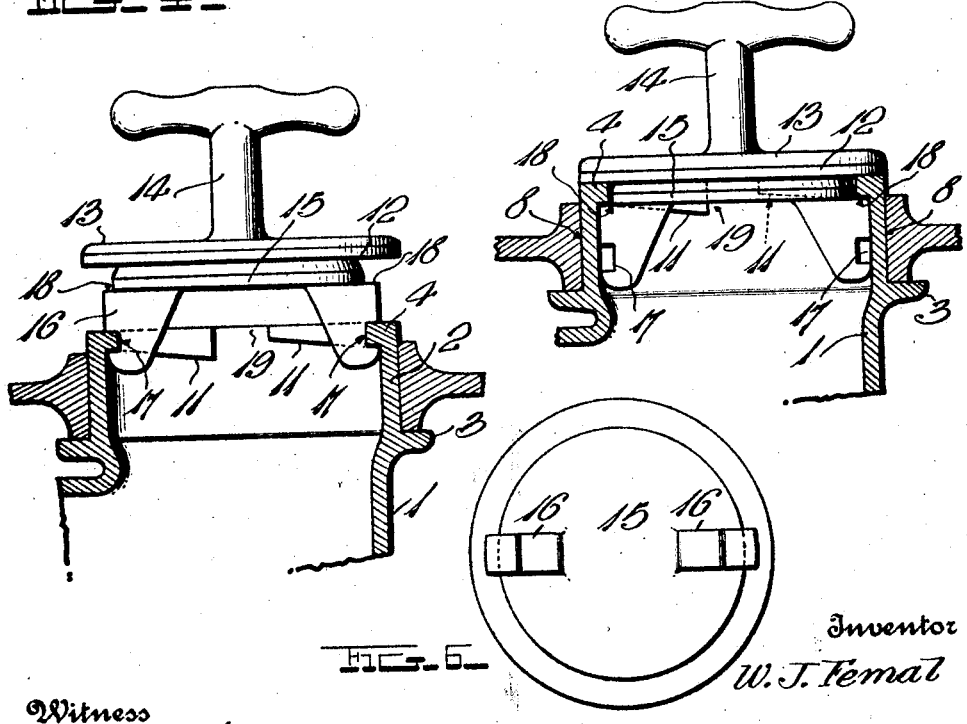

Patented Dec. 1, 1925.

1,563,695

UNITED STATES PATENT OFFICE.

WILLIAM J. FEMAL, OF GREEN BAY, WISCONSIN.

COMBINED CATCH BASIN AND TRAP.

Application filed April 25, 1925. Serial No. 25,853.

*To all whom it may concern:*

Be it known that I, WILLIAM J. FEMAL, a citizen of the United States, residing at Green Bay, in the county of Brown and State of Wisconsin, have invented certain new and useful Improvements in Combined Catch Basins and Traps; and I do declare the following to be a full, clear, and exact description of the invention, such as will enable others skilled in the art to which it appertains to make and use the same.

My invention aims to provide a new and improved form of combination catch basin and trap, which will possess numerous advantages over similar devices heretofore employed.

In carrying out the above end, a further object is to provide a unique form of valve which will prevent back flow of water from the sewer, through the trap and into the catch basin, this valve being manually controlled and being provided with an operating handle located within the catch basin below the ordinary perforated top plate of the latter, so that it will be entirely out of the way.

With the foregoing and minor objects in view, the invention resides in the novel subject matter hereinafter described and claimed, the description being supplemented by the accompanying drawings.

Figure 1 is a side elevation of the trap and the valve, illustrating the catch basin in vertical section.

Figure 2 is a top plan view of the trap.

Figure 3 is a vertical transverse sectional view as indicated by line 3—3 of Fig. 1.

Figure 4 is a detail sectional view partly in elevation, showing the manner in which the valve is normally held open.

Figure 5 is a view similar to Fig. 4 but illustrating the valve in closed position.

Figure 6 is a bottom plan view of the valve.

Figure 7 is a detail vertical section partly in elevation showing a slightly different form of valve.

Figure 8 is a detail vertical section illustrating an extension which may be used upon the catch basin if necessary.

In the drawings above briefly described, the numeral 1 designates a trap adapted to be embedded below the floor of a basement or the like, said trap being of such size that all of its contents cannot be siphoned out, and will not evaporate even in exceptionally warm or dry basements. The receiving end 2 of the trap 1 is provided with an outstanding rib 3 spaced downwardly from its upper extremity 4, and this end of the trap is preferably provided with an integral, external, coupling member 5, by means of which tiling or the like may be connected with the trap, for instance to carry rain water thereto from the roof, or to act as an overflow for a cistern.

The numeral 6 designates a catch basin whose bottom 7 is formed with a central opening 8 through which the upper extremity of the receiving end of the trap 1 passes, said bottom resting on the rib 3. This catch basin is provided with the usual perforated, removable cover plate 9, and it is provided, preferably at two opposed points, with outwardly projecting flanges or other coupling members 10, by means of which drain tiling may be connected with it. It will be observed that the basin 6 may rotate upon the trap 1. This is very desirable, as it permits one or both of the coupling members 10 to be directed in the necessary direction for connection with drain tiling conveniently.

In the present showing, the interior of the receiving end 2 of the trap 1, is formed with a pair of arcuate, substantially opposed ribs 11 whose lower sides are inclined in the same direction, the upper surfaces of these ribs being preferably flush with the upper extremity 4, as shown. This upper extremity is machined or ground to provide a valve seat co-operable with a gasket 12 carried by the lower side of a horizontal valve disk 13, which disk is provided with an upstanding operating handle 14 disposed entirely within the catch basin 6. The lower side of the disk 13 is preferably provided with a downwardly projecting, circular boss 15 which is surrounded by the gasket 12, and formed integrally with the lower side of this boss, are two lugs 16 which are receivable within the receiving end 2 of the trap 1. The outer sides of these lugs are formed with notches 17 to engage the ribs 11 as shown in Fig. 4, for the purpose of holding the valve in upwardly spaced relation with the seat 4, and at their upper ends, said lugs project outwardly from the boss 15 to provide shoulders 18 which may be engaged with the lower sides of said ribs 11 as shown in Fig. 5, to hold the valve closed, with its gasket 12 tightly seated against the seat 4, so that return of liquid from the trap 1 to the basin 6, cannot take place. This is obviously very desirable, in localities in which water rapidly rises, due to rainfall or other cause. Obviously, by rotating the handle 15 until the lugs 16 are disposed at the gaps 19, between the ends of the ribs 11, the entire valve may be either raised or lowered, as occasion may demand, and it may be readily removed entirely, should it be necessary to gain access to the interior of the trap, for instance to clean the same. When either the notches 17 or the shoulders 18 are to be engaged with the ribs 11, after the valve has been rotated sufficiently to initially engage them with the ribs, turning of the valve in the proper direction, will cause the lower, inclined sides of the ribs 19 to tightly wedge the valve in place.

In the construction shown in Fig. 7, a valve disk 13$^a$ is shown having two lugs 16$^a$ adapted to engage the lower sides of the ribs 11, to hold the valve in closed position, but in this instance, no provision is made for holding the valve open, it being understood that it must be entirely removed, when its use is not needed. In order to operate this valve or that previously described, it is necessary to remove the cover plate 9, as the valve handle is normally below said cover plate so that it will be entirely out of the way.

In some instances, it is advisable to provide an extension wall such as that shown at 20 in Fig. 8 to rest upon the wall of the catch basin 6, instead of engaging the cover plate 9 directly with said basin wall. Then, the cover plate 9 may engage the upper end of the wall 20, as shown.

As excellent results are obtainable from the details disclosed, they are preferably followed. However, within the scope of the invention as claimed, modifications may of course be made.

I claim:

1. A device of the class described comprising a conduit having an open end and a pair of internal arcuate ribs at said open end, a closure adapted to span the open end of the conduit, and lugs carried by the inner side of said closure to engage the inner sides of the aforesaid ribs when the closure is turned, said sides of said ribs being inclined with respect to the axis about which the closure is rotated.

2. A device of the class described comprising a conduit having an open end and a plurality of arcuate internal ribs at said end, the inner sides of said ribs being inclined, a closure adapted to span the open end of the conduit, and lugs carried by the inner side of said closure, said lugs having two sets of shoulders to engage the inclined inner sides of said ribs to hold the closure either in open or in closed position.

In testimony whereof I have hereunto affixed my signature.

WILLIAM J. FEMAL.